May 11, 1965 G. M. BINON 3,182,699
FROZEN FOOD SHAVING AND THAWING MACHINE
Filed July 31, 1962 3 Sheets-Sheet 2
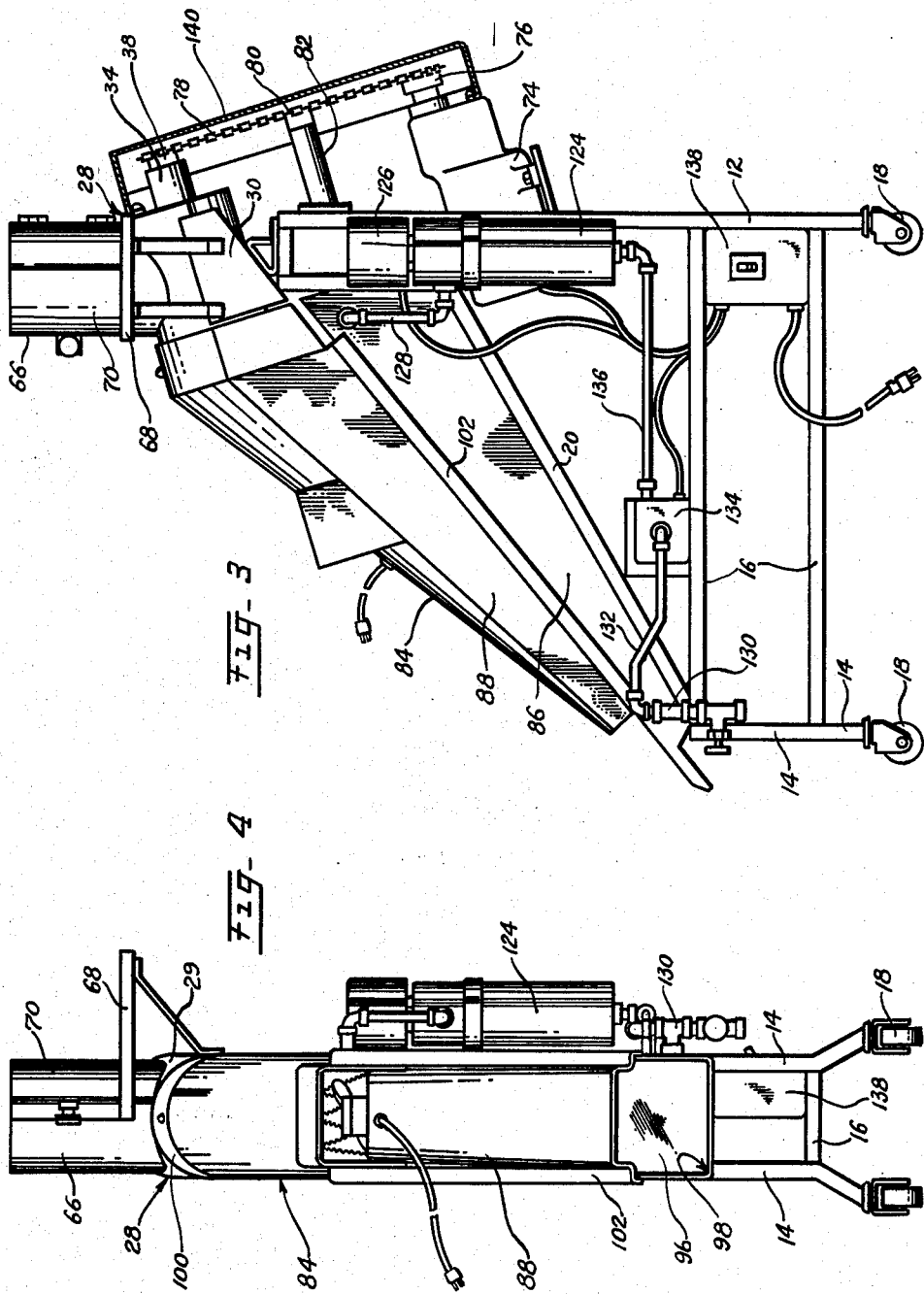

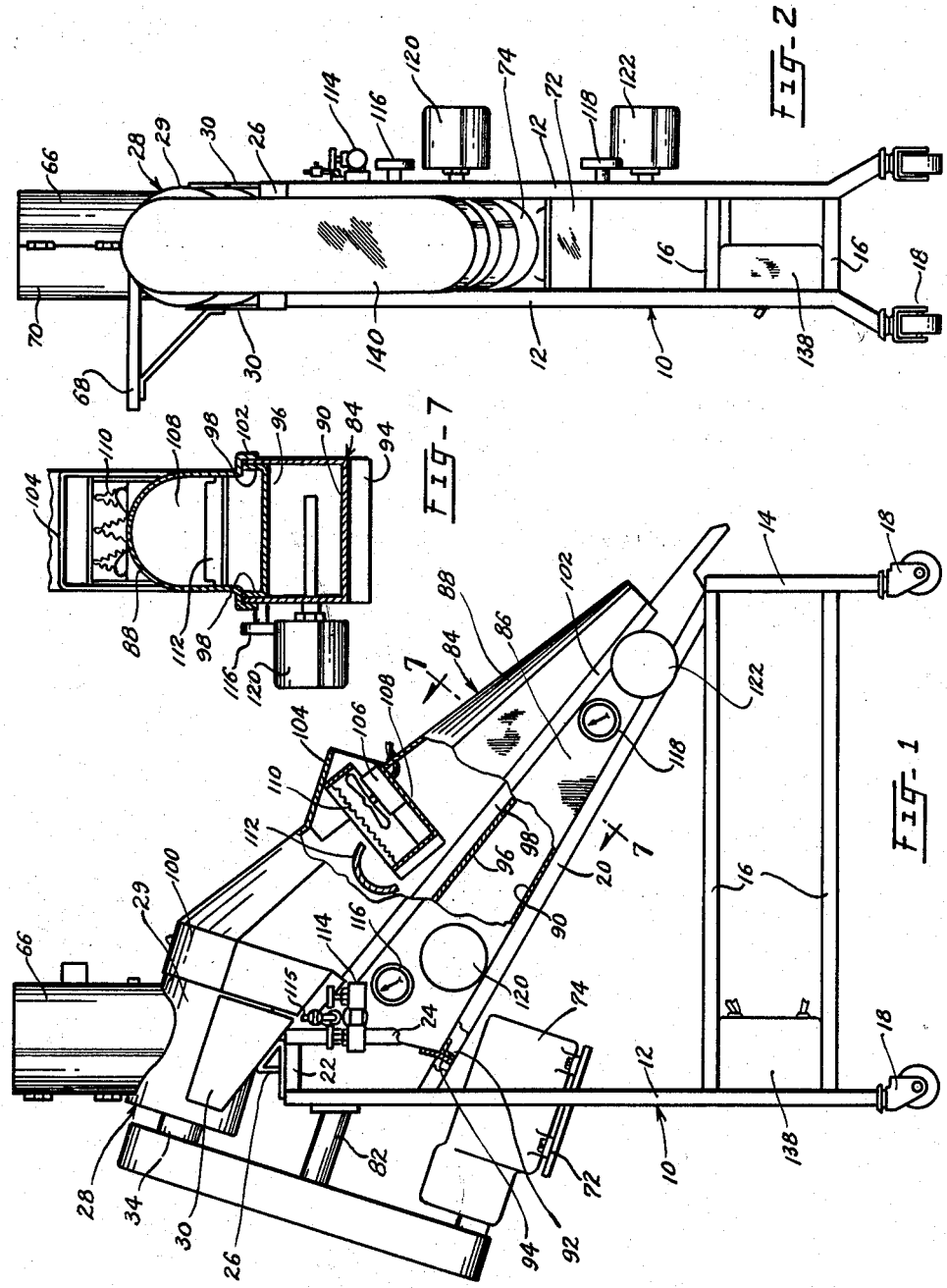

May 11, 1965 G. M. BINON 3,182,699
FROZEN FOOD SHAVING AND THAWING MACHINE
Filed July 31, 1962 3 Sheets-Sheet 3

United States Patent Office 3,182,699
Patented May 11, 1965

3,182,699
FROZEN FOOD SHAVING AND THAWING
MACHINE
Georges M. Binon, 3593 Monroe Ave., Pittsford, N.Y.
Filed July 31, 1962, Ser. No. 213,697
7 Claims. (Cl. 146—91)

This invention relates to a machine for thawing frozen food, particularly frozen eggs.

The baking industry is presently using frozen eggs in baking operations. It is customary to package these frozen eggs in thirty pound sealed tin cans. The eggs are are frozen in these thirty pound tins in three different forms, namely, frozen egg whites; frozen egg yolks; and, frozen combined yolks and whites. The current practice in the baking industry is to have these frozen eggs thawed and raised to a temperature equal to that of the other products entering into the baking operation which wil normally run about room temperature or slightly higher, or approximately 70 to 85 degrees Fahrenheit. Present practice shows that anywhere from about 12 hours to 36 hours or more is required to thaw a 30 pound frozen egg block. Frequently, the thawed frozen egg portions at the outside of the block will decompose and spoil before the central portion of the egg block can be thawed. This causes considerable difficulty in the handling of frozen eggs for baking purposes. Considerable time is also lost in obtaining thawed eggs elevated to room temperature ready for use in a baking operation.

An object of the present invention is to provide a machine for taking a block of frozen food or eggs as produced for commercial use and completely thawing said frozen block of food or eggs in a very short time by shaving small particles from the frozen blocks and thawing the particles to produce thawed eggs or food at the desired temperature.

Another object of the invention is to provide a machine having a casing provided with a portion for receiving a block of frozen food, such as eggs, a cutter being mounted in the casing for movement to shave particles of the food from the frozen block until it is converted into food shavings, and continuously heating the shavings as they leave the cutter to produce thawed food heated to a desired temperature in a very short period of time ready for use in baking.

Still another object of the invention is to provide a simple inexpensive rotary shaving cutter mounted in a suitable casing so that a block of eggs may be supported by the casing on the upper portion of the cutter with a suitable motor for driving the cutter so the shaver blades carried by the cutter will shave flakelike particles of frozen food or eggs from the block for thawing in a short period of time.

A further object of the invention is to provide a machine in which shaved particles of frozen food or eggs are deposited on the upper end of an inclined conveyor member dividing a housing into upper and lower compartments so heat may be applied in each of the compartments for heating the conveyor member and food particles to melt them as they move down the conveyor member from the upper end for delivering thawed food or eggs from the lower end of the conveyor. The conveyor member may be in the form of a thin plate of metal such as aluminum, or of plastic material, in either case having a smooth upper surface for receiving the frozen egg particles, and may be either movable (a travelling plastic belt, for example) or stationary. If stationary, it is arranged at an angle so the egg particles as the melting progresses will flow downwardly over the surface of the conveyor plate to the lower end where they are delivered into a mixing bowl or other container such as the can from which the frozen block has been removed. The eggs or other frozen food are continuously thawed in a minimum of time by continuous delivery of the food particles to the conveyor member until the entire frozen block of food or eggs has been converted into shaved particles.

A still further object of the invention is to provide a machine for thawing frozen food, particularly frozen eggs, by taking a block of frozen eggs and shaving thin particles of frozen eggs from the block, then conveying the frozen egg particles through a heated zone for thawing the particles as they move through the heated zone until the particles are completely thawed and delivered as thawed food particles from the heating zone into a suitable container, the shavings being continually formed and thawed until the desired portion of the frozen block has been removed and thawed.

Yet another object is the provision of simple and inexpensive mechanism for quickly thawing any desired portion of a frozen block or mass of eggs or other foodstuffs, without thawing or deteriorating the remainder of the frozen block or mass, thus enabling quick usage of any desired fraction of a standard size package, leaving the remainder to be returned undamaged to refrigerated storage for use at a subsequent time.

Another object of the invention is to form the cutter casing with a guide portion and a supporting plate or platform having the section of the guide casing over the supporting plate hinged for swinging movement to open position for receiving a frozen block of food on the supporting plate and subsequent slidable movement into the guide portion of the casing onto the top position of the cutter without having the frozen food block dropped on the cutter and thereby prevent damage to the cutter.

Another feature of the invention resides in a thawing unit having a housing constructed with a sheet metal conveyor plate dividing the housing into upper and lower compartments in which the upper portion of the housing is formed with an entrance and delivery openings at opposite ends, in which the upper portion of the housing is removable from the lower portion for cleaning the conveyor plate and in which separate and different means for heating the conveyor plate on both sides may be provided and controlled in a predetermined manner so frozen food particles supplied to the conveyor plate at one end will be thawed and delivered at the opposite end at a desired temperature.

Another feature of the invention is in providing the upper compartment of the housing with an air inlet on the top portion thereof with an electric fan mounted inside the opening for sucking air into the housing and circulating it through a heater element in front of the fan. The fan will circulate heat from the heater element throughout the upper portion of the casing and where the casing containing the shaving unit is secured to the entrance portion of the housing it will also circulate heat into the casing through the entrance opening for heating the cutter member and the casing. A suitable baffle is mounted in the upper compartment of the casing in the path of the air discharged through the heater by the fan for directing part of the heat downwardly and over the lower inclined portion of the conveyor plate.

The invention provides for the application of thermometers to the housing for indicating the temperature in different parts of the housing so that suitable controls which preferably operate automatically, may be adjusted to secure the desired temperature in the housing for thawing out frozen eggs or other food to the desired temperature in a rapid manner to prevent spoiling any of the food particles.

These and other desirable objects may be attained in the manner disclosed and an illustrative embodiment of the invention in the following description and in the accompanying drawings forming a part thereof, in which:

FIG. 1 is a side elevation of a food shaving and thawing machine constructed according to a preferred embodiment of the present invention;

FIG. 2 is an end elevation of the machine looking from the left hand side of the machine as shown in FIG. 1;

FIG. 2 is a side elevation of the opposite side of the machine from that shown in FIG. 1, on which has been added a food heating and circulating pump with connections to the lower compartment of the housing for securing pump circulation of water in the lower compartment of the housing;

FIG. 4 is an end elevation, looking from the right hand end of FIG. 3;

FIG. 7 is a cross section through the thawing unit taken substantially along the line 7—7 of FIG. 1.

Figures 5, 6:
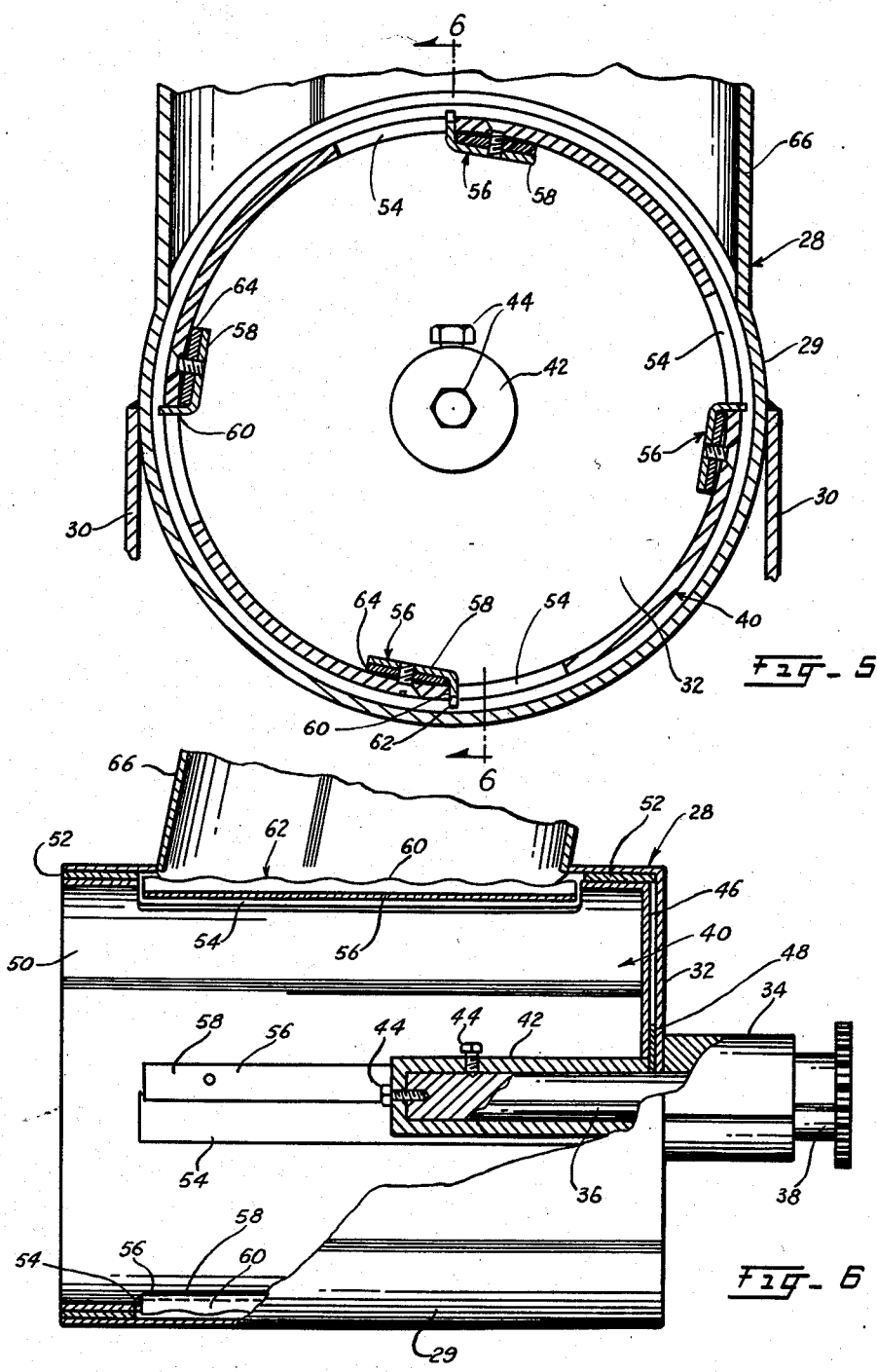
FIG. 5 is an enlarged transverse cross-section through the central portion of the casing, rotary shaving member and guide portion, with the upper end of the guide portion broken away.
FIG. 6 is a longitudinal section taken substantially on the line 6—6 of FIG. 5 with fragmentary portions shown in elevation for convenience in illustration.

The present invention is particularly designed for thawing frozen eggs in the form of egg whites, egg yolks, or combined eggs and yolks. These egg products are usually frozen in thirty pound blocks sealed in tin cans and maintained at a temperature of about ten degrees below zero Fahrenheit. The present invention provides a machine and method for thawing these eggs to a temperature of about fifty to eighty-five degrees Fahrenheit for use in the usual commercial bakery formulas for food mixes. The present invention is therefore designed to rapidly thaw a thirty pound can of frozen eggs from the below zero temperature to the fifty to eighty-five degree temperature in a short space of time such as fifteen minutes to half an hour, to facilitate the prompt use of the eggs in a baking operation.

The invention provides a portable machine having a suitable support 10 in the form of a frame having vertical legs 12 at one end and vertical legs 14 at the opposite end. A plurality of horizontal bars 16 extend between vertical bars 12 and 14 on each side of the machine support and also between bars 12 and 14 at opposite ends of the machine, as shown in FIG. 1 and 2 and connect the legs together to form a rigid support. The horizontal bars 16 extend in spaced parallel relation between the several vertical legs 12 and 14 respectively. The leg portions 12 and 14 from the uppermost horizontal bars 16 to the lower ends thereof may be of any suitable length desired for supporting the mechanism carried above the upper bars 16 at a desired height above the floor surface on which the machine is mounted. The lower ends of the legs 12 and 14 have casters 18 mounted thereon so the machine may be moved about on the floor of a bakery or other building into a desired location for its use or storage.

The vertical legs 12 are substantially longer than the legs 14 as shown in FIG. 1 for example, and have a pair of inclined supporting bars 20 arranged in spaced parallel relation on opposite sides of the supporting frame 10 with opposite ends of the bars 20 secured to the upper ends of the vertical legs 14 and upper end portions of the vertical legs 12 respectively as shown in FIGS. 1 and 3. The upper terminal portions of the legs 12 have inwardly extending substantially horizontal bars 22 which are rather short and have the inner ends connected to the upper terminals of the vertical bars 24. The lower ends of the vertical bars 24 are secured to the inclined supporting bars 20. The bars 24 are arranged in spaced parallel relation to and inwardly of the vertical legs 12 at opposite sides of the supporting frame 10 for cooperation with the bars 22 and vertical legs 12 for mounting the base plate 26 extending transversely between and having opposite end portions seated on the top portions of the horizontal bars 22.

A shaver unit, indicated at 28, has a cylindrical casing 29 mounted with its axis in inclined relation on top of the base plate 26 to which the lower intermediate portion of the casing 29 is secured by welding or the like. A pair of side plates 30 are secured at the upper edges by welding or the like to the outer side portions of the casing 29 and have the lower inclined edges thereof secured to the outer end portions of the base plate 26. The side plates 30 are arranged in substantially vertical and parallel relation to each other and cooperate with the casing 29 to rigidly support the shaver unit on the base plate 26.

The casing 29 has the lower left end open, as shown in FIG. 6, and the upper left hand end, as shown in FIG. 1, and the right hand end as shown in FIG. 6, provided with an end wall 32 closing the upper end of the casing 29. The end wall 32 carries a shaft bearing 34 for rotatably mounting a drive shaft 36 carrying a driven sprocket 38 on the outer end thereof, while the inner end projects axially into the casing 29 for detachably mounting a shaving cutter 40, FIGS. 5 and 6.

The shaving cutter 40 has a hub portion 42 slidably engaged on the inner end of the drive shaft 36 and detachably secured thereto by a pair of set screws 44. The end of the hub portion adjacent to the end wall 32 carries a supporting disk 46 which extends radially outward from the hub portion 42 and is arranged in spaced relation to the end wall 32 by bearing washer 48. The outer margin of the supporting disk 46 carries the cutter cylinder 50. The marginal portions at opposite ends of the cutter cylinder 50 may have nylon bearing rings 52 mounted thereon to provide a rotatable bearing surface between the cutter cylinder 50 and the inside end marginal surfaces of the casing 29. It will be understood that any other form of bearing to provide a low friction contact between the cutter cylinder 50 and the casing 29 may be provided such as ball or roller bearings.

The cutter cylinder 50 has a plurality of rectangular openings 54 formed therein and extending longitudinally, as shown in FIGS. 5 and 6. In the construction as illustrated in the drawing, there are four to eight rectangular openings 54 provided in the cutter cylinder 50 arranged in equally spaced relation about the cutter cylinder. Four to eight shaver blades 56 are provided which have a length equal to the length of the longer dimension of the rectangular openings 54 arranged so they may be inserted with portions extending through the openings 54. Each shaver blade 56 has an attaching portion 58 constructed to overlie the inner surface of the cutter cylinder 50 along one marginal portion of a rectangular opening 54, as shown in FIGS. 5 and 6. Each shaver blade 56 has a shaving portion 60 extending laterally from one edge of the attaching portion 58 thereof.

The shaving portion of each plate extends through one of the rectangular openings 54 in substantially outwardly extending radial relation beyond the outer surface of the cutter cylinder 50. The outer free edge of the shaving portion 60 is formed to provide an undulating or scalloped shaving edge indicated at 62 in FIGS. 5 and 6. The outwardly projecting portions of the scalloped edge 62 extend beyond the outer surface of the cutter cylinder 50 a distance sufficient to perform a shaving operation by cutting thin film particles from a frozen block of food while the lower portions between the high portions of the shaving edge extend inwardly slightly below the outer surface of the cutter cylinder 50. Preferably the scalloped edge of one blade is offset longitudinally with respect to the scallops of the next succeeding blade, through a distance equal to one-half the pitch of the scallops, so that the projecting scallop tips on one blade will cut slight grooves in the frozen food block in locations where the scallop depressions of the previous blade left slight ridges in the frozen block.

The shaver blades 56 may be mounted so that the extent to which the shaving edge 62 and shaving portion 60 project beyond the surface of the cutter cylinder 50 may be adjusted by placing shims 64 between the attaching portion 58 and the adjacent portion of the cutter cylinder 50, as shown in FIG. 5. Suitable attaching screws extend through apertures in the cutter cylinder 50 and engage the attaching portions 58 for rigidly attaching the shaver blades 56 in position on the cutter cylinder. By changing the thickness of the shims 64, the extent to which the shaving edges 62 of the several shaver blades 56 project beyond the outer surface of the cutter cylinder 50 can be controlled to obtain the desired thickness of the thin film particles which will be shaved by the shaver blades.

The shaver unit 28 has a guide portion 66 formed on the casing 29 and extending vertically therefrom. This guide casing 66 extends upwardly about the margin of an opening formed in the top portion of the casing 29, as shown in FIGS. 5 and 6. A supporting and guide plate 68 has the inner end attached to the guide casing 66 adjacent to the top center portion of the casing 29. The supporting and guide plate 68 is arranged in substantially horizontal position and extends outwardly from one side of the guide casing 66, as shown in FIGS. 2 and 4. The outer end may be suitably supported by diagonal brace connections between the outer end of the supporting and guide plate 68 and the side of the casing 29 below.

The guide casing 66 has a portion, at the side carrying the supporting plate 68 and above the surface of the plate 68, which is divided from the remainder of the guide casing 66, to provide a door section 70 hingeably connected at one side to the adjacent portion of the guide casing 66 and having a latch member at the opposite side to hold the door section in closed position, as shown in FIGS. 1 and 2. This guide casing construction forming part of the casing 29 and extending above the shaving cutter 40 provides a convenient construction for inserting a frozen block of food or frozen eggs into the machine for shaving. For this purpose the door 70 is swung to open position and a frozen block of eggs upon removal from its can has one end portion engaged on the top of the supporting and guide plate 68. The frozen food block may then be pushed into the guide casing 68 and over the aperture in the casing 29 so it will slide downwardly a short distance until the lower end engages against the upper surface of the cutter cylinder 50 through the opening in the upper portion of the casing 29. This arrangement facilitates the insertion of the frozen food block without damaging the cutter. The door section 70 is then moved into closed position to hold the frozen block of food in position during the shaving operation.

The motor mounting plate 72 is secured at one end of the support 10 between the vertical legs 12 above the horizontal bar 16 and below the ends of the inclined supporting bars 20, as shown in FIGS. 1 and 2. An electric motor 74 has a gear reduction unit that drives a shaft provided with a drive sprocket 76 alined with the driven sprocket 38 on the drive shaft 36. A drive chain 78 is engaged over the sprockets 38 and 76, as shown in FIG. 3. A tension sprocket 80 rotatably mounted on an arm 82 is adjustably secured to the upper end portion of a vertical leg 12 so the proper tension may be applied to the drive chain 78 to efficiently drive the shaving cutter 40 from the motor 74. This driving operation of the shaving cutter 40 by the motor 74 will rotate the shaving cutter shaft 36 so the cutter cylinder 50 and the shaving edges 62 of the shaver blades 56 will rotate in the casing 29 in engagement with the bottom end of the frozen food block slidably supported in the guide casing 66.

As the projecting portions of the shaving edges 62 pass across the lower end of the frozen food block, they will shave thin film particles of frozen food from the block. These particles will fall through the openings 54 and flow downwardly through the inclined shaving cutter 40 and casing 29 and outwardly from the open end thereof. It will be understood that the undulating or scalloped edges 62 of the several shaver blades 56 are arranged so the high portions projecting outwardly from the cutter cylinder will be offset relative to each other. The offset high portions of each shaving edge will engage a different part of the frozen food block in the shaving operation for rapidly shaving thin film particles of frozen food from the entire lower end surface of the block while the weight of the block sliding downwardly in the guide casing 66 will maintain contact of the lower end with the cutter cylinder and the shaving edges 62. The shaving of thin film portions of frozen food from the block to remove as much of the frozen food as may be desired from the block or to completely convert the frozen food block into frozen shavings is obtained by continued operation of the shaving cutter 40.

The shaving cutter 40 is quickly removable through the open end of the casing 29 from the drive shaft 36 by loosening the set screws 44. Then, the inside of the casing and the entire cutter can be cleaned to maintain the proper degree of sanitation in the shaver unit 28 for preventing the accumulation of old egg or other food shavings in the casing and cutter as well as bacteria and other foreign matter. With this construction proper sanitary conditions may be maintained for the operation of the machine according to the health codes of the various States.

A thawing unit 84 has a housing formed of a bottom member 86 and a top removable cover member 88. The bottom member 86 has a bottom wall 90 and side and end walls extending upwardly therefrom to form a lower compartment in the bottom member of the housing. The bottom member 86 has a width equal to that of the support 10 so the side margins of the bottom wall 90 will engage and seat on the upper surfaces of the inclined supporting bars 20 at opposite sides of the support 10, as shown in FIGS. 1, 3, and 4. The bottom member 86 is positioned on the support 10 in inclined position as shown in FIG. 1 and has the upper end of the bottom seated on a transverse supporting bar 92, FIG. 1.

A retaining strip 94 is mounted on the end wall so that the lower edge projects below the bottom wall 90 at the left hand end of the bottom member 86, as shown in FIG. 1, for engaging against the transverse supporting bar 92. This retaining strip 94 serves to detachably support the thawing unit 84 with the bottom member 86 in position on the support 10 so that one end of the housing forming the thawing unit 84 may be interengaged with the casing 29 in a manner that will be hereinafter described.

The side walls of the bottom member 86 forming the lower compartment are higher at the upper or left hand end, as shown in FIG. 1, than at the lower or right hand end so the upper edges of the side walls are inclined relative to the bottom wall 90. A sheet metal conveyor plate 96 or conveyor member formed of a piece of thin aluminum sheet metal or stainless steel is formed with upwardly extending side flanges 98 to provide a troughlike conveyor member between opposite open ends thereof. The sheet metal conveyor plate 96 is formed of sufficient width so that the outside surfaces of the side flanges 98 will slidably engage the inside faces along the upper marginal portions of the side walls of the bottom member 86.

The conveyor plate or member 96 will be supported with the upper face thereof between and below the upper inclined edges of the side walls of the bottom member 86, as shown in FIGS. 1 and 7. The upper edges of the side flanges 98 terminate in coincident relation with the upper edges of the side walls and determine the position of the plate 96 in the bottom member. The conveyor plate or member 96 terminates at opposite ends in engagement with the end walls of the bottom member 86 and is welded or otherwise suitably sealed completely around the marginal portions to the side and end walls of the bottom member 86 to provide a fluid tight compartment or tank below the conveyor member 96. The upper or left hand end of the conveyor plate 96 is located under the open end of the casing 29 for receiving frozen food shavings or particles discharged from the open end of the casing 29.

The cover member 88 is mounted on top of the bottom member 86 to extend substantially throughout the length thereof with an interfitting angularly extending end portion 100 slidably engaging over the outer open end of the casing 29, as shown in FIGS. 1 and 3. The interfitting end portion 100 and the marginal portion of the casing 29 engaged under the end portion 100 may be provided with a pin and slot connection or other suitable means to detachably retain the top cover member in position on the casing 29 and the bottom member 86. The side walls of the top removable cover member 88 for the housing are higher at the end provided with the end portion 100 and taper in height toward the opposite end, as shown in FIG. 1. The lower edges of the side walls of the cover member 88 or top section of the housing, have outwardly and downwardly extending flanges 102 arranged so that the outwardly extending portions engage on the upper edges of the side walls and upwardly extending side flanges 98 of the conveyor member with the downwardly extending flanges at the outer edges slidably engaging over the outside faces of the side walls of the bottom member 86, as shown in FIGS. 1, 4 and 7.

The lower or right hand end of the removable cover member 88 is open and extends above the conveyor member 96 so that food particles can slide downwardly and outwardly over the conveyor member into a suitable bowl, can, or the like, positioned below the outer discharge end of the conveyor member 96 which projects outwardly beyond the vertical legs 14, as shown in FIG. 1. The cover member 88 forms the upper compartment for the housing providing the thawing unit 84. The upper end of the cover member 88 is open so that air circulation can occur between opposite ends through the upper compartment. The upper or lefthand end of the cover member 88, as shown in FIG. 1, opens into the open end of the casing 29 of the shaving unit while the portion of the cover member 88 below the casing 29 is also open for air circulation.

The central portion of the cover member 88 is formed with an outwardly flared bonnet 104 in the top portion thereof providing an air inlet into the upper compartment. An electric motor driven fan 106 is mounted on transverse wall 108 extending across the inside top of the cover member 88, as shown in FIG. 1, which also supports a heating unit 110 having a plurality of heating coils located adjacent to the fan 106 so that in operation of the fan the air will be drawn in the air intake under the bonnet 104 and blown through the heating unit 110 into the upper compartment formed by the cover member 88.

A transversely extending semi-cylindrical baffle 112 extends across the central portion of the cover member 88 and has the end portions secured by welding or the like to the side walls. This baffle 112 has an upper edge directed toward and located adjacent to lower portions of the heating unit 110. The lower marginal portion extends below transverse wall 108 and the heating unit and is so arranged that when the fan 106 operates to draw air in under the bonnet 104 and blow it through the heating unit 110, the lower half of the fan discharge through the heating unit will engage the baffle 112 and reverse the flow of the air so it will blow downwardly toward the conveyor plate 96 and toward the outer discharge end of the housing, as shown at the righthand end of FIG. 1, remote from the casing 29. The discharge of the fan above the baffle 112 will blow hot air toward the upper lefthand end of the housing through the end portion 100 and into casing 29 and the cutter cylinder 50. This will provide a constant source of heated air blowing against the cutter cylinder 50 during the shaving operation thereof to keep the temperature of the casing 29 and the cutter cylinder 50 high enough to cause the food particles shaved from the frozen food block from freezing on the cutter member. This will aid in partial thawing of the particles so they will fall and slide out of the casing and cutter cylinder into the upper end of the thawing unit 84 on the conveyor plate 96. The heated air in the upper compartment within the cover member 88 will be circulated in both directions in the cover member so as to be blown outwardly from opposite ends of the cover member in heating the inside of the upper compartment, heating the upper surface portions of the conveyor plate or member 96 and also heating the frozen food particles delivered into the upper chamber onto the conveyor member 96.

The lower compartment in the bottom member 86 below the conveyor plate or member 96 is also constructed to contain a heating medium of any suitable character for maintaining a desired degree of heat against the bottom side of the conveyor plate 96. One means of heating the conveyor plate or member 96 from the bottom side is by circulating hot water in the lower compartment formed by the bottom member 86. This may be done in either one of several ways as illustrated in the drawings. A suitable fitting 114 of conventional form may be in the form of a T-shaped mixing valve fitting having two valves therein for manual control and for the connection of both hot and cold water supply connections to opposite ends thereof as will be clear from the illustration in FIG. 1. These pipe connections may be made with sources of hot and cold water supply so that the tank formed by the bottom member 86 may be filled with water at the desired temperature. An air vent 115, FIG. 1, is mounted in the top side wall portion of the bottom member 86 so that the air in the lower compartment may escape while the compartment is being filled with hot water. A valve controls the air vent to close the vent when the compartment is filled with water. The bottom member 86 is provided with upper and lower temperatures gages or thermometers 116 and 118 respectively, so that control of the water temperature can be maintained to obtain the desired temperatures at both the upper and lower ends of the bottom member 86.

Where the water supply is not sufficient to permit circulation of the water into and out of the bottom member 86, through the fitting 114 and the drain connection on fitting 130, FIG. 3, the fitting 114 may be used to fill the lower compartment with water or any other suitable heating fluid. Upper and lower thermostatically controlled electric heating units of conventional form indicated at 120 and 122 may be mounted on one side wall of the bottom member 86 with the heating portion extending through the side walls into and under the conveyor plate 96. These heating units will have conventional adjustable controls to obtain and maintain the desired heat in each unit. In this way the upper end of the casing may be maintained at a higher temperature than the lower end together with the conveyor plate 96 since the temperature of the egg or food particles delivered to the upper end of the conveyor plate 96 are normally at a lower temperature than the temperature of the food particles near the lower end of the conveyor member 96. It therefore requires more heat at the upper end to carry on the thawing operation in the housing forming the thawing unit 84 than at the lower end.

Another and modified construction for heating the water or other fluid in the bottom member 86, is shown in FIGS. 3 and 4, where a heating tank 124 is mounted at the side of the machine on one of the upright legs 12. The upper end of the heating tank 124 has a thermostatically controlled electric heating unit 126 mounted thereon which is similar to the units 120 and 122 and has the heating element extending into the heating tank 124 to heat the water or other fluid in the tank. The upper end of the heating tank 124 has a pipe connection 128 with the upper end of the bottom member 86, as shown in FIG. 3. The lower end of the bottom member 86 is provided with a pipe fitting 130 in the form of a T-fitting with a pipe connection 132 to a motor driven pump 134 of suitable conventional form. The motor driven pump 134 has an electric motor drive and is mounted on the upper side of an upper horizontal bar 16, as shown in FIG. 3. The pipe connection 132 is connected to the inlet connection on the pump 134 while the outlet portion of the pump has a pipe connection 136 with the bottom portion of the heating tank 124.

The pipe fitting 130 has a valve controlled drain connection mounted thereon which may be used to drain water or other liquid out of the tank when desired while the pipe fitting 114 will be used to fill the tank with liquid or other fluid, or for circulating fluid, as above mentioned. When the motor operates the pump 134 the water or other fluid in the bottom member 86 will be circulated from the heating tank 124 into the upper portion of the member 86 and then caused to circulate downwardly under the conveyor plate 96 to the bottom portion of the bottom member 86 where it is withdrawn through the pipe 132 and again circulated back to the heating chamber 124 by the pump 134. The control of the heating unit 126 may be set to obtain the desired water temperature for the operation of the thawing unit 84 in conjunction with the heat provided by the fan and heating unit 110 in the upper compartment. Any combination or all of these heating methods and means for the bottom member 86 may be used where found desirable to maintain a desired temperature for the conveyor plate 96. Also, the bottom member 86 may be subdivided by one or more partitions into a plurality of separate compartments, with separate control of the temperature of the heating liquid in each, thus enabling more accurate control of the temperature of each portion of the thawing conveyor.

A terminal box 138 is mounted on the inside edge of one of the upright legs 12 between the horizontal bars 16, as shown in FIGS. 1, 2, and 3. The electric motor 74, the heating units 120, 122, 124 and the motor for driving the pump 134 will be provided with flexible electric wire connections extended into and connected to terminal blocks and fuse blocks or circuit breakers of conventional form within the terminal box 138. A flexible cord connection having a plug on the end for insertion into a suitable socket for connecting the machine to a source of electrical supply is also connected to the terminal box 138 and provides a convenient means for plugging into a conventional socket for supplying the machine with electric power.

The motor driven fan 106 and the heating unit 110 in the top cover member 88 are provided with a separate cord and plug connection for plugging into a socket for supply of electric power thereto. This independent connection is made in order that the cover member 88 may be removed from the bottom member 86 for inspection, repairs and cleaning so the thawing unit may be cleaned and maintained in a sanitary condition.

A suitable form of guard 140 is detachably mounted on the motor 74 and the casing 79 to extend over the drive chain 78 and the sprockets to cover this drive mechanism to prevent injury to the operator of the machine through accidental contact with the moving parts.

The present invention provides a compact machine for thawing frozen eggs and other similar frozen food products. The machine is particularly designed to thaw frozen eggs packed and frozen in thirty pound cans maintained at a temperature of 10 degrees below zero. Instead of requiring a period of from two to four days to thaw a thirty pound can of egg whites, yolks, or whole eggs, the present machine is designed to thaw such a can of eggs in from ten or fifteen to thirty minutes, from a temperature of ten degrees below zero to a temperature of from seventy to eighty five degrees Fahrenheit.

The block of frozen eggs is inserted into the guide casing 66 in the manner above described so that the lower end portion will engage the cutter cylinder 50 and slide downwardly in the guide casing as the shaving edges 62 of the shaver blades 56 shave thin film particles of the frozen eggs at the low temperature from the lower end of the block for passage through the apertures in the cutter cylinder 50 and outwardly through the open end of the shaving cutter and the casing 29 into the upper end of the thawing unit housing 84 onto the conveyor plate 96. The hot air circulated by the motor driven fan 106 in the upper chamber of the thawing unit 84 will continuously heat the casing 29 and the cutter cylinder 50 together with the shaved egg particles as they leave the shaving edges 62 to start the thawing operation thereof as they move outwardly from the shaving cutter into the thawing unit 84.

This heating of the flakelike egg or food particles at the low temperature starts thawing of the particles about the surface portions thereof. As these particles strike portions of the cutter cylinder 50, some of the shavings or flakes may drop out of the bottom of the cutter cylinder through the openings associated with the cutter blades, before they reach the open end of the cylinder, and the remainder will slide downwardly and outwardly through the open end of the casing 29 onto the upper end of the conveyor plate or member 96 aided by the thawed outer surface thereof. The heated conveyor plate and the air circulated in the upper chamber will cause further thawing of the egg particles so that the outer thawed surface portion of the particles and the incline of the conveyor plate 96 will provide for the sliding of the particles downwardly along and over the surface of the plate 96, if the conveyor member is stationary, although an inclination is not necessary if the conveyor member is in the form of a moving belt of plastic material or of thin flexible metal.

The more the particles become thawed, the more fluid is attached about the outer surfaces of the particles so they will more readily slide down the conveyor plate 96 if it is stationary as in the preferred construction, toward the open lower end thereof. The conveyor plate 96 will be inclined at an angle of approximately 45 to 50 degrees upwardly from the horizontal. As the egg particles slide down the conveyor plate 96 they will become completely thawed and the temperature thereof raised to the desired range of 70 to 85 degrees Fahrenheit by the time they reach the open end of the housing and freely flow downwardly off the free end of the conveyor plate 96 and fall into a suitable bowl used on a mixing machine or into the can from which the original block was removed.

In obtaining this thawing of the frozen egg particles, the temperature at the upper end of the bottom member 86 will be maintained at the desired thawing temperature selected by the operator, anywhere from about 50 or 60 degrees up to approximately 115 degrees F. for frozen egg whites, up to about 120 degrees F. for whole eggs, and up to about 125 degrees F. for egg yolks. The temperature at the lower end of the bottom member 86 will be maintained preferably at somewhat lower maximum temperatures for the three types of frozen eggs referred to above, so that these temperatures toward the lower end will run at not more than approximately 80, 85, and 90 degrees respectively, for the three different types of frozen egg particles. The various controls on the heating units for heating the fluid in the bottom member 86 are adjusted to obtain the temperatures above described, which may be raised or lowered by adjusting the automatic controls on the heating elements to meet varying conditions which may result from variations in the temperature of the frozen egg block. The above description gives an optimum illustration of how the machine operates to thaw frozen egg particles of the three different types described,